(12) United States Patent
Lee et al.

(10) Patent No.: US 9,456,512 B2
(45) Date of Patent: Sep. 27, 2016

(54) MOBILE TERMINAL

(75) Inventors: Jang Won Lee, Seoul (KR); Chan Woong Park, Seoul (KR); Ki Nam Kim, Seoul (KR)

(73) Assignee: BLUEBIRD INC. (KR)

( * ) Notice: Subject to any disclaimer, the term of this patent is extended or adjusted under 35 U.S.C. 154(b) by 23 days.

(21) Appl. No.: 14/110,599

(22) PCT Filed: Aug. 31, 2012

(86) PCT No.: PCT/KR2012/006997
§ 371 (c)(1),
(2), (4) Date: Mar. 4, 2015

(87) PCT Pub. No.: WO2014/034981
PCT Pub. Date: Mar. 6, 2014

(65) Prior Publication Data
US 2015/0237751 A1    Aug. 20, 2015

(51) Int. Cl.
*H05K 7/14*     (2006.01)
*H05K 7/18*     (2006.01)
(Continued)

(52) U.S. Cl.
CPC .......... *H05K 5/0247* (2013.01); *H05K 5/0004* (2013.01); *H05K 7/1427* (2013.01)

(58) Field of Classification Search
USPC ........ 361/803, 799, 816, 818; 235/449, 493, 235/453; 340/635; 200/5 R, 1 B, 310, 314, 200/16 A, 5 A
See application file for complete search history.

(56) References Cited

U.S. PATENT DOCUMENTS 3,941,964 A    3/1976    Yoder
4,659,881 A *  4/1987    Dowe .................... H01H 13/64
                                                    200/5 R
(Continued)

FOREIGN PATENT DOCUMENTS

JP    2008033593    2/2008
JP    2008130737    6/2008
(Continued)

OTHER PUBLICATIONS

European Search Report—European Application No. 12872305.3 issued on Feb. 19, 2014, citing US 2011/279279, US 2011/215938, WO 01/63994 and US 2012/18040.
(Continued)

*Primary Examiner* — Hung S Bui
(74) *Attorney, Agent, or Firm* — Cantor Colburn LLP

(57) ABSTRACT

A mobile terminal includes a case capable of being assembled or disassembled, a printed circuit board (PCB) arranged in the case and having a tamper detection pattern, the tamper detection pattern having a plurality of conductive areas and at least one non-conductive area, a conductive area connection unit arranged between the case and the PCB and electrically connecting a part of the conductive areas during assembly of the case and electrically disconnecting the part of the conductive areas during disassembly of the case, and a conductive area connection detection circuit electrically connected to the conductive areas and detecting an electric connection state between the conductive areas. The conductive areas includes a first conductive area, a plurality of second conductive areas arranged to be separated from one another and connected to the first conductive area via the conductive area connection unit, and a third conductive area, at least a part of which is arranged between the second conductive areas.

15 Claims, 5 Drawing Sheets

(51) Int. Cl.
*H05K 5/02* (2006.01)
*H05K 5/00* (2006.01)

(56) References Cited

U.S. PATENT DOCUMENTS

| | | | |
|---|---|---|---|
| 5,510,584 A * | 4/1996 | Norris | H01H 13/64 200/1 B |
| 7,060,924 B1 * | 6/2006 | Beene | H01H 13/702 200/314 |
| 7,763,815 B2 * | 7/2010 | Luong | H01H 13/703 200/16 A |
| 7,923,830 B2 | 4/2011 | Pope et al. | |
| 8,513,548 B2 * | 8/2013 | Rollet | G06F 21/83 200/5 A |
| 9,213,869 B2 * | 12/2015 | Yanko | G06K 7/083 |
| 2007/0102272 A1 * | 5/2007 | Sano | H01H 13/48 200/310 |
| 2008/0028168 A1 | 1/2008 | Muraoka | |
| 2011/0215938 A1 | 9/2011 | Neo et al. | |
| 2011/0279279 A1 | 11/2011 | Mirkazemi-Moud et al. | |
| 2012/0180140 A1 | 7/2012 | Barrowman et al. | |

FOREIGN PATENT DOCUMENTS

| | | |
|---|---|---|
| KR | 1020090130046 | 12/2009 |
| WO | 0163994 | 8/2001 |

OTHER PUBLICATIONS

International Search Report—PCT/KR2012/006997 dated Mar. 20, 2013.

* cited by examiner

MOBILE TERMINAL

TECHNICAL FIELD

The inventive concept relates to a mobile terminal, and more particularly, to a mobile terminal which may detect tamper.

BACKGROUND ART

Mobile terminals are freely used while being carried regardless of places. Typical mobile terminals are payment terminals used for credit cards, mobile communication terminals such as mobile phones, and personal digital assistants (PDAs) that are referred to as personal portable terminals. Accordingly, the term "mobile terminal" used herein includes all of these terminals, but the payment terminal will be mainly discussed for convenience of explanation.

A payment terminal stores and processes a large quantity of important data, for example, personal information. Accordingly, it is necessary to use a tamper detection mechanism that may detect hardware or software tamper to hack important data.

Typical tamper is to hack important data by disassemble the payment terminal In other words, a case in which a printed circuit board is arranged is disassembled to hack important data from various circuit parts mounted on the printed circuit board.

Thus, a payment terminal according to a conventional technology includes a case disassembly recognition portion that recognizes disassembly of a case and a hacking blocking portion connected to the case disassembly recognition portion to erase important data when the case is disassembled.

The case disassembly recognition portion is configured in a switching method and recognizes assembly and disassembly of a case. In other words, the case disassembly recognition portion includes a tamper detection pattern provided on a printed circuit board and having two conductive members arranged to be separated from each other and a moving member movably provided between the printed circuit board and the case and electrically connecting the two conductive members by moving therebetween.

The case disassembly recognition portion recognizes assembly of a case as the moving member contacts the conductive member during assembly of a case and disassembly of a case as the moving member is separated from the conductive member during disassembly of a case.

As tamper develops further, a tamper method that disturbs the case disassembly recognition portion has appeared. The developed tamper method uses conductive liquid. After forming a small hole in the case, conductive liquid is injected onto the tamper detection pattern.

When conductive liquid is injected on the tamper detection pattern, the two conductive members separated from each other are electrically connected by the conductive liquid. Accordingly, when the moving member is separated away from the conductive member due to the disassembly of a case, the case disassembly recognition portion may not recognize the disassembly of a case.

Thus, there is a demand for development of a mobile terminal that may deal with the tamper of disturbing the case disassembly recognition portion like the method of injecting conductive liquid onto the tamper detection pattern.

DETAILED DESCRIPTION OF THE INVENTION

Technical Problem

The inventive concept provides a mobile terminal which may prevent hacking of important data by neutralizing tamper that intends to disable detection of disassembly of a case According to an aspect of the inventive concept, there is provided a mobile terminal includes a case capable of being assembled or disassembled, a printed circuit board (PCB) arranged in the case and having a tamper detection pattern, the tamper detection pattern having a plurality of conductive areas and at least one non-conductive area, a conductive area connection unit arranged between the case and the PCB and electrically connecting a part of the conductive areas during assembly of the case and electrically disconnecting the part of the conductive areas during disassembly of the case, and a conductive area connection detection circuit electrically connected to the conductive areas and detecting an electric connection state between the conductive areas, in which the conductive areas includes a first conductive area, a plurality of second conductive areas arranged to be separated from one another and connected to the first conductive area via the conductive area connection unit, and a third conductive area, at least a part of which is arranged between the second conductive areas.

The first conductive area may be provided in a circular or polygonal shape in a central area of the tamper detection pattern.

The plurality of second conductive areas may be arranged separated from one another along a circumference of the first conductive area around an imaginary center of the first conductive area.

The plurality of second conductive areas each may be provided in a shape of an arc having a predetermined curvature.

The plurality of second conductive areas may be arranged at an equiangular interval.

The third conductive area may include a first non-contact portion arranged between the plurality of second conductive areas, a second non-contact portion arranged close to the first conductive area and between the non-conductive areas, and a third non-contact portion arranged at a position separated from the first conductive area farther than the first non-contact portion.

The second non-contact portion may have a width that increases toward the first conductive area.

The non-conductive area may include a first non-conductive area portion arranged between the first conductive area and the plurality of second conductive areas, a second non-conductive area portion extending from the first non-conductive area portion and arranged between the plurality of second conductive areas and the first non-contact portion, and a third non-conductive area portion extending from the first non-conductive area portion and arranged between the second non-contact portion and the first conductive area.

The conductive area connection unit may include a plurality of contact legs arranged separated from one another and connected to the plurality of second conductive areas, and a contact head connected to the plurality of contact legs and capable of moving in a direction approaching or separating from the first conductive area.

Each of the plurality of contact legs may include a support portion supported by contacting each of the plurality of second conductive areas, and a connection portion extending in a direction separating from each of the plurality of second conductive areas and connected to the contact head.

The connection portion may elastically bias the contact head in a direction to be separated from the first conductive area.

The contact head may be provided in a shape of a circular or polygonal plate.

The contact head may be provided in a shape of a circular plate, and the contact head may include a first plate portion connected to the plurality of contact legs, a second plate portion connected to the first plate portion and having a shape protruding downwardly, and a third plate portion connected to the second plate portion and having a shape protruding downwardly.

The third plate may be provided in a shape of a circle having a predetermined diameter, and the first plate portion and the second plate portion may be provided in a shape of a circle having the same center point as the third plate portion.

The tamper detection pattern may have a circular shape, and the plurality of second conductive areas may be configured with four conductive bodies arranged symmetrically with respect to the first conductive area as an imaginary center.

Advantageous Effects

In the exemplary embodiments of the present inventive concept, the second conductive areas of the tamper detection pattern are arranged separated from one another and a part of the third conductive area is arranged between the second conductive areas. Since the third conductive area is connected to the second conductive areas or the first conductive area by a conductive liquid that is injected to forcibly connect the first conductive area and the second conductive areas, the conductive area connection detection circuit may detect such tamper.

DESCRIPTION OF THE DRAWINGS

Exemplary embodiments of the inventive concept will be more clearly understood from the following detailed description taken in conjunction with the accompanying drawings in which.

MODE OF THE INVENTIVE CONCEPT

Figure 1:
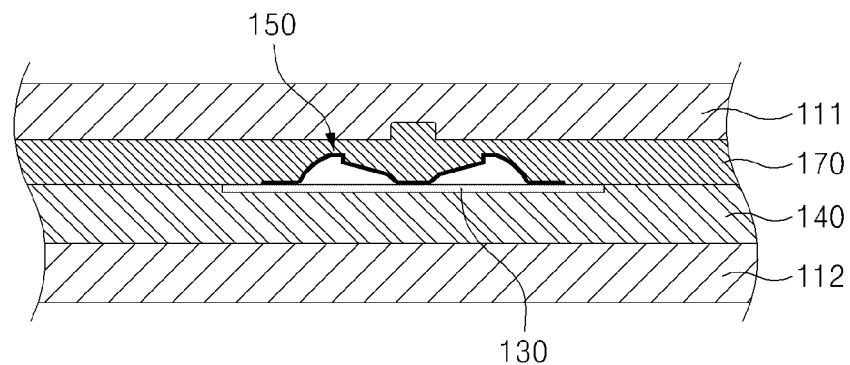
FIG. 1 schematically illustrates an internal structure of a mobile terminal according to an exemplary embodiment of the present inventive concept.

The attached drawings for illustrating embodiments of the inventive concept are referred to in order to gain a sufficient understanding of the inventive concept and the merits thereof Hereinafter, the inventive concept will be described in detail by explaining embodiments of the inventive concept with reference to the attached drawings. Like reference numerals in the drawings denote like elements.

Although a term "mobile terminal" used in the following description may be interpreted to include payment terminals used for credit cards, mobile communication terminals such as mobile phones, and personal digital assistants (PDAs) that are referred to as personal portable terminals, the term "mobile terminal" is used herein for convenience of explanation.

Figure 2:
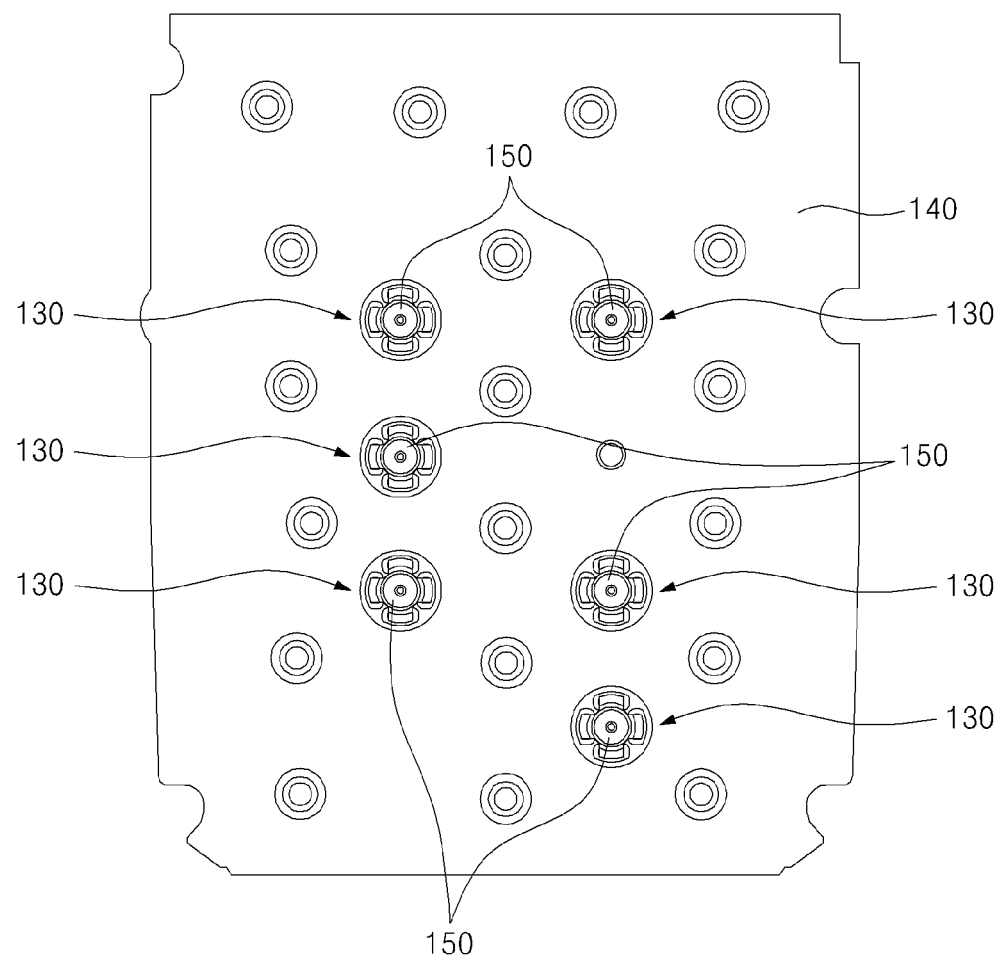
FIG. 2 is a plan view of a printed circuit board of FIG. 1.
Figure 3:
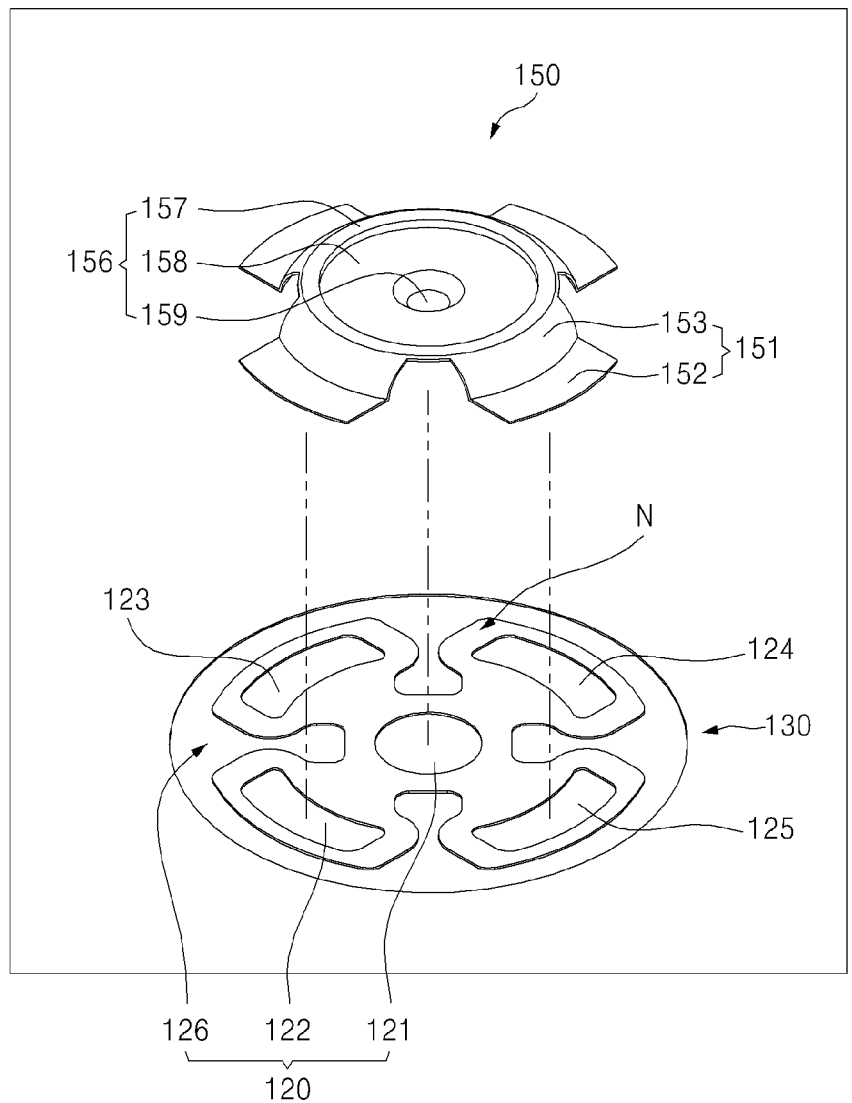
FIG. 3 is an exploded perspective view illustrating a tamper detection pattern and a conductive area connection unit of FIG. 1.
Figure 4:
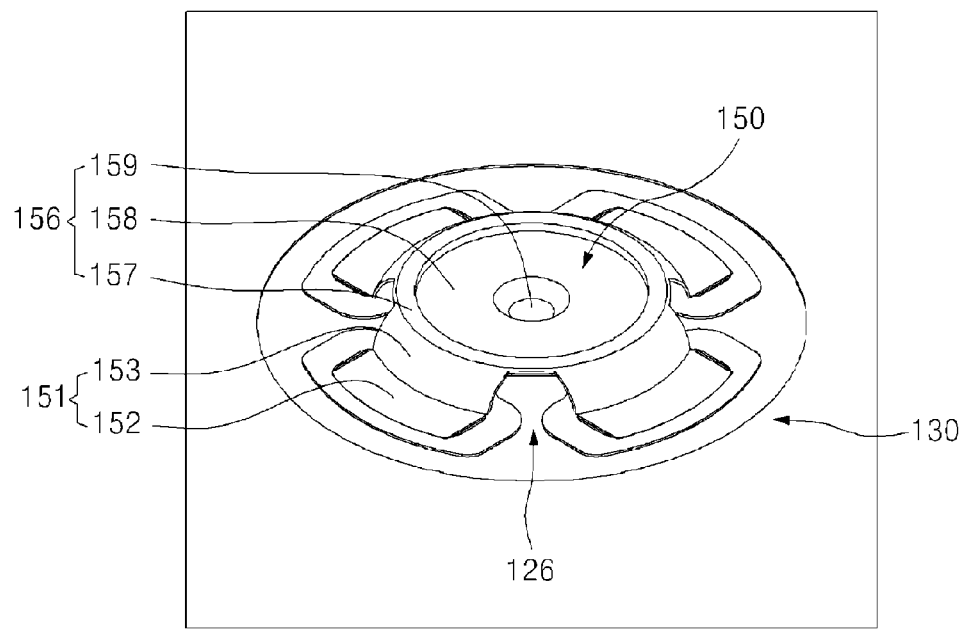
FIG. 4 is a perspective view illustrating that the conductive area connection unit of FIG. 1 is arranged on the tamper detection pattern.
Figure 5:
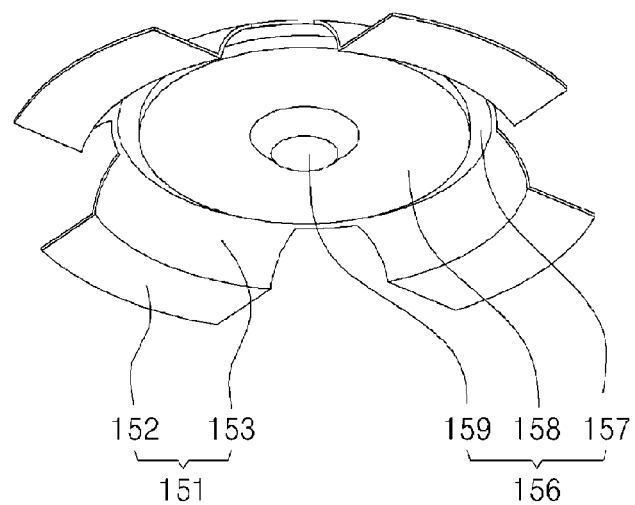
FIG. 5 is a perspective view illustrating the conductive area connection unit of FIG. 3 viewed from the bottom side thereof.
Figure 6:
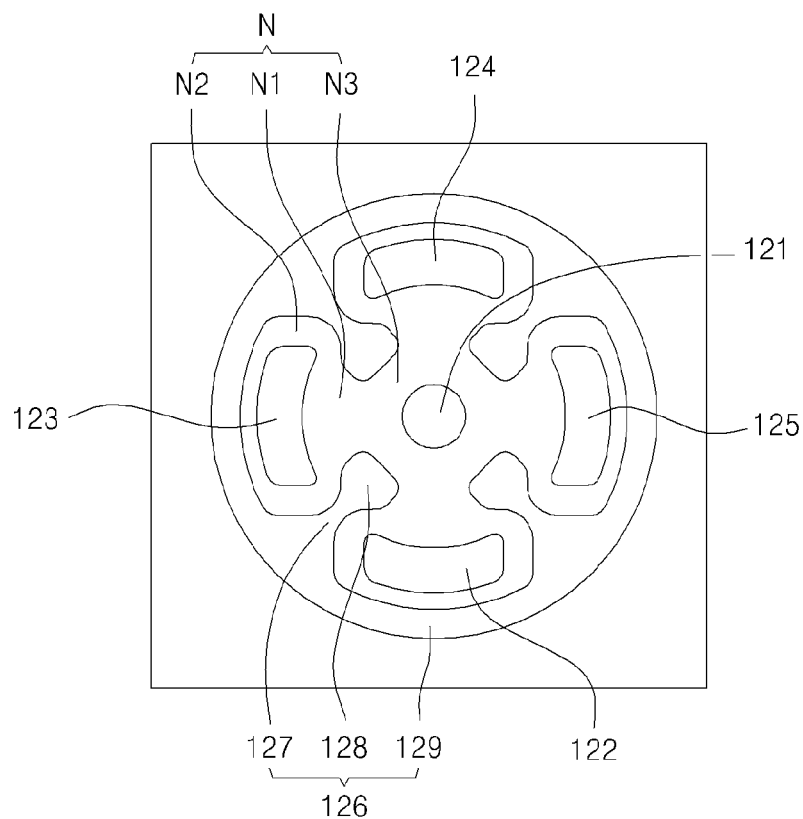
FIG. 6 is a plan view of the tamper detection pattern of FIG. 3.
Figure 7:
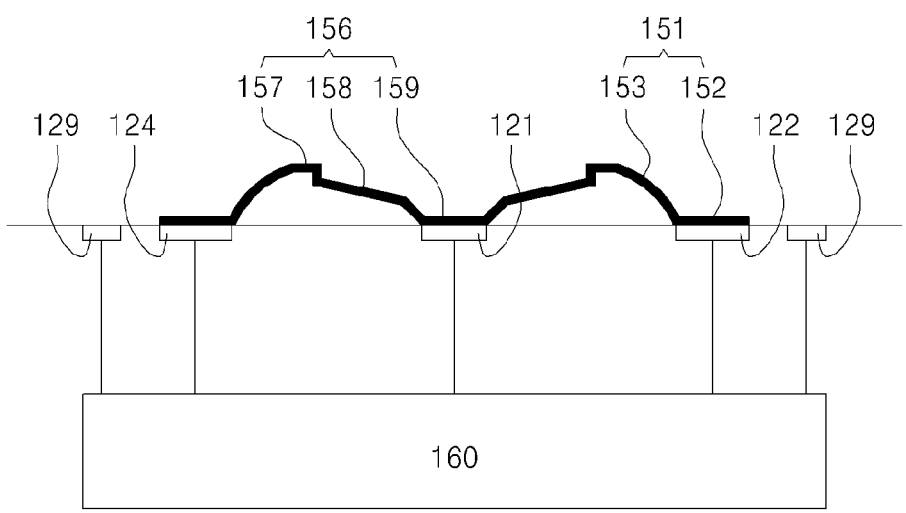
FIG. 7 is an operation state view illustrating a state of the conductive area connection unit of FIG. 1 being pressed by assembly of a case.
Figure 8:
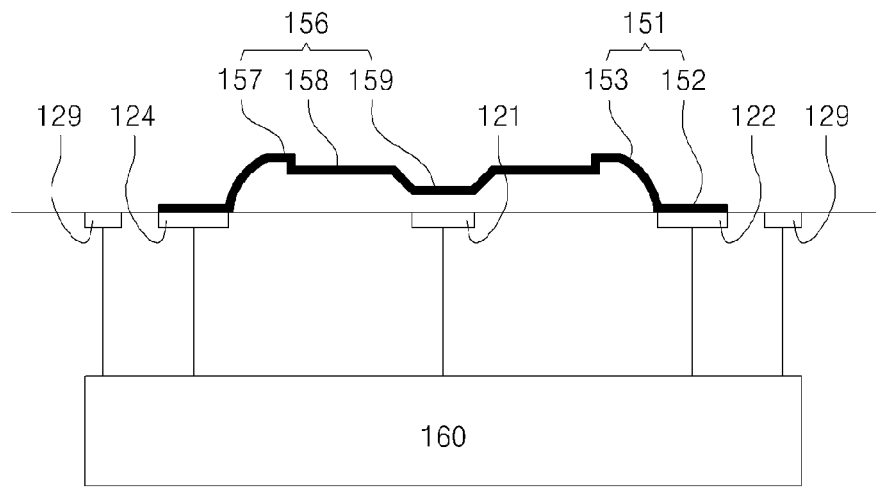
FIG. 8 is an operation state view illustrating a state of the conductive area connection unit of FIG. 1 being released by disassembly of the case.
Figure 9:
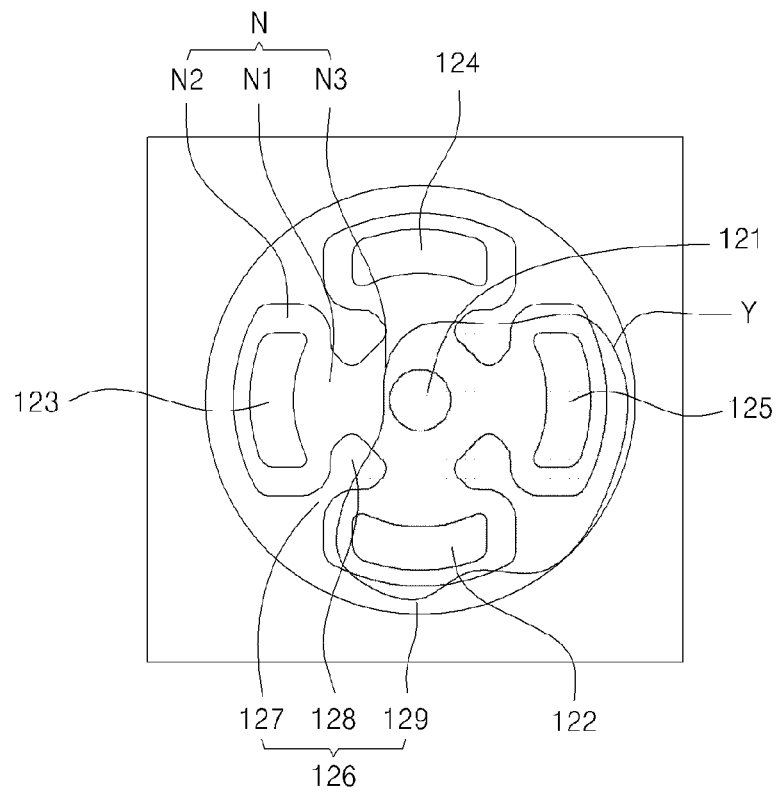
FIG. 9 illustrates that conductive liquid is injected onto the tamper detection pattern of FIG. 1.

FIG. 1 schematically illustrates an internal structure of a mobile terminal according to an exemplary embodiment of the present inventive concept. FIG. 2 is a plan view of a printed circuit board of FIG. 1. FIG. 3 is an exploded perspective view illustrating a tamper detection pattern and a conductive area connection unit of FIG. 1. FIG. 4 is a perspective view illustrating that the conductive area connection unit of FIG. 1 is arranged on the tamper detection pattern. FIG. 5 is a perspective view illustrating the conductive area connection unit of FIG. 3 viewed from the bottom side thereof FIG. 6 is a plan view of the tamper detection pattern of FIG. 3. FIG. 7 is an operation state view illustrating a state of the conductive area connection unit of FIG. 1 being pressed by assembly of a case. FIG. 8 is an operation state view illustrating a state of the conductive area connection unit of FIG. 1 being released by disassembly of the case. FIG. 9 illustrates that conductive liquid is injected onto the tamper detection pattern of FIG. 1.

As illustrated in FIGS. 1 to 9, a mobile terminal according to an exemplary embodiment of the present inventive concept includes a case 110 capable of being assembled or disassembled, a printed circuit board (PCB) 140 arranged in the case 110 and having a tamper detection pattern 130, the tamper detection pattern 130 having a plurality of conductive areas 120 and at least one non-conductive area N, a conductive area connection unit 150 arranged between the case 110 and the PCB 140 and electrically connecting a part of the conductive areas 120 during assembly of the case 110 and electrically disconnecting the part of the conductive areas 120 during disassembly of the case 110, and a conductive area connection detection circuit 160 electrically connected to the conductive areas 120 and detecting an electric connection state between the conductive areas 120.

The case 110 protects the PCB 140 by encompassing the PCB 140 during assembly. In the present embodiment, the case 110 includes an upper case 111 and a lower case 112.

The PCB 140 is provided with the tamper detection pattern 130. In the present exemplary embodiment, the tamper detection pattern 130 has a circular shape, but the present inventive concept is not limited thereto and a polygonal shape, for example, may be used therefor.

Also, the tamper detection pattern 130 is provided in multiple numbers to more accurately detect tamper. In the present exemplary embodiment, for convenience of explanation, 6 tamper detection patterns 130 are provided on the PCB 140.

The tamper detection pattern 130 includes the conductive areas 120 and the at least one non-conductive area N.

In the present exemplary embodiment, the conductive areas 120 are formed of conductive bodies that are electrically conductive. The conductive areas 120 include a first conductive area 121, a plurality of second conductive areas 122, 123, 124, and 125 arranged to be separated from one another and connected to the first conductive area 121 via the conductive area connection unit 150, and a third conductive area 126, at least a part of which is arranged between the second conductive areas 122, 123, 124, and 125.

The first conductive area 121, the second conductive areas 122, 123, 124, and 125, and the third conductive area 126 are separated from one another by the non-conductive area N. The conductive area 120 and the non-conductive area N will be described in detail later for convenience of explanation.

The conductive area connection unit 150 is arranged between the case 110 and the PCB 140 and electrically connects the first conductive area 121 and the second conductive areas 122, 123, 124, and 125 during assembly of the case 110 and electrically disconnects the first conductive area 121 and the second conductive areas 122, 123, 124, and 125 during disassembly of the case 110.

The conductive area connection unit 150 includes a plurality of contact legs 151 connected to the second conductive areas 122, 123, 124, and 125 and a contact head 156 connected to the contact legs 151 and capable of moving in a direction approaching or separating from the first conductive area 121.

The contact legs 151 are connected to the second conductive areas 122, 123, 124, and 125 by soldering. Each of the contact legs 151 includes a support portion 152 supported by contacting the second conductive areas 122, 123, 124, and 125 and a connection portion 153 extending in a direction separating from the second conductive areas 122, 123, 124, and 125 and connected to the contact head 156.

The connection portion 153 elastically biases the contact head 156 in a direction to be separated from the first conductive area 121. In other words, during disassembly of the case 110, the connection portion 153 separates the contact head 156 from the first conductive area 121 by an elastic restoration force.

Consequently, the contact head 156 contacts the first conductive area 121 overcoming the elastic restoration force of the connection portion 153 by being pressed during assembly of the case 110 and is released from the first conductive area 121 by the elastic restoration force of the connection portion 153 during disassembly of the case 110.

The contact head 156 may be provided in a shape of a circular or polygonal plate. In the present exemplary embodiment, the contact head 156 is provided in a shape of a circular plate. The contact head 156 includes a first plate portion 157 connected to the contact legs 151, a second plate portion 158 connected to the first plate portion 157 and having a shape protruding downwardly, and a third plate portion 159 connected to the second plate 158 and having a shape protruding downwardly.

The third plate portion 159 is provided in a shape of a circle having a predetermined diameter. Also, the first plate portion 157 and the second plate portion 158 are provided in a shape of a circle having the same center point as the third plate portion 159.

The mobile terminal according to the present exemplary embodiment further includes a pressing member 170 pressing the contact head 156 in a direction toward the first conductive area 121. The pressing member 170 may be provided on the upper case 111 or separately arranged between the upper case 111 and the conductive area connection unit 150.

As such, in the mobile terminal according to the present exemplary embodiment, since the second plate portion 158 and the third plate portion 159 protrude downwardly, that is, in a direction toward the first conductive area 121, an excessive pressing force is not need during assembly of the case 110 and thus the contact between the third plate portion 159 and the first conductive area 121 is made easy.

The first conductive area 121 is provided in a circular or polygonal shape in a central area of the tamper detection pattern 130. In the present exemplary embodiment, the first conductive area 121 is provided in a circular shape for convenience of explanation.

The second conductive areas 122, 123, 124, and 125 are connected to the first conductive area 121 via the conductive area connection unit 150. The second conductive areas 122, 123, 124, and 125 are arranged separated from one another along the circumference of the first conductive area 121 around the first conductive area 121 as an imaginary center.

The second conductive areas 122, 123, 124, and 125 each are provided in a shape of an arc having a predetermined curvature. Also, in the present exemplary embodiment, the second conductive areas 122, 123, 124, and 125 are arranged with an equiangular interval. Also, in the present exemplary embodiment, the second conductive areas 122, 123, 124, and 125 are arranged symmetrically with respect to the first conductive area 121 as an imaginary center.

In the present exemplary embodiment, the second conductive areas 122, 123, 124, and 125 are configured by four as illustrated in FIGS. 1 to 9. In the mobile terminal according to the present exemplary embodiment, since the second conductive areas 122, 123, 124, and 125 are provided in multiple numbers to be separated from one another, tamper that forcibly electrically connects the second conductive areas 122, 123, 124, and 125 and the first conductive area 121 becomes more difficult.

In other words, if one of the second conductive areas 122, 123, 124, and 125 is forcibly connected to the first conductive area 121 and then the case 110 is disassembled, since the other ones of the second conductive areas 122, 123, 124, and 125 are not electrically connected to the first conductive area 121 by the disassembly of the case 110, the conductive area connection detection circuit 160 may detect the disassembly of the case 110.

At least a part of the third conductive area 126 is arranged between the second conductive areas 122, 123, 124, and 125. The third conductive area 126, as illustrated in FIG. 6, includes a first non-contact portion 127 arranged between the second conductive areas 122, 123, 124, and 125, a second non-contact portion 128 arranged close to the first conductive area 121 and between the non-conductive areas N, and a third non-contact portion 129 arranged at a position separated from the first conductive area 121 farther than the first non-contact portion 127.

The first non-contact portion 127 is arranged between the second conductive areas 122, 123, 124, and 125. As such, as the first non-contact portion 127 is arranged between the second conductive areas 122, 123, 124, and 125, when a conductive liquid Y is injected onto the tamper detection pattern 130, the first non-contact portion 127 is electrically connected to the second conductive areas 122, 123, 124, and 125. The electrical connection between the first non-contact portion 127 of the third conductive area 126 and the second conductive areas 122, 123, 124, and 125 is detected by the conductive area connection detection circuit 160 and thus hacking of important data by a method such as erasing data may be prevented.

The second non-contact portion 128 is arranged close to the first non-contact portion 127 and the first conductive area 121, and between the non-conductive areas N. As the second non-contact portion 128 is arranged close to the first conductive area 121, when the conductive liquid Y is injected onto the tamper detection pattern 130, the second non-contact portion 128 is electrically connected to the first conductive area 121. The electrical connection between the second non-contact portion 128 and the first conductive area 121 is detected by the conductive area connection detection circuit 160 and thus hacking of important data by a method such as erasing data may be prevented.

The width of the second non-contact portion 128 increases toward the first conductive area 121. In other words, as the size of the second non-contact portion 128 increases toward the first conductive area 121, possibility of contacting the conductive liquid Y injected for tamper increases and thus possibility of detecting tamper may increase.

The third non-contact portion 129 is arranged at a position separated from the first conductive area 121 farther than the first non-contact portion 127. Consequently, the third non-contact portion 129 is arranged close to the second conductive areas 122, 123, 124, and 125, as illustrated in FIG. 6, and thus, when the conductive liquid Y is injected onto the tamper detection pattern 130, the third non-contact portion 129 is electrically connected to the second conductive areas 122, 123, 124, and 125. The electrical connection between the third non-contact portion 129 and the second conductive areas 122, 123, 124, and 125 is detected by the conductive area connection detection circuit 160 and thus hacking of important data by a method such as erasing data may be prevented.

The non-conductive area N includes a first non-conductive area portion N1 arranged between the first conductive area 121 and the second conductive areas 122, 123, 124, and 125, a second non-conductive area portion N2 extending from the first non-conductive area portion N1 and arranged between the second conductive areas 122, 123, 124, and 125 and the first non-contact portion 127, and a third non-conductive area portion N3 extending from the first non-conductive area portion N1 and arranged between the second non-contact portion 128 and the first conductive area 121.

The operation of the mobile terminal configured as above will be described below with reference to FIGS. 1 to 9. First, during the assembly of the case 110, as illustrated in FIG. 7, the conductive area connection unit 150 is pressed due to the assembly of the case 110 and this the third plate portion 159 contact the first conductive area 121. The electrical connection between the third plate portion 159 and the first conductive area 121 is detected by the conductive area connection detection circuit 160.

Next, during the disassembly of the case 110, as illustrated in FIG. 8, the pressing of the conductive area connection unit 150 is removed by the disassembly of the case 110 and thus the third plate portion 159 is removed from contacting the first conductive area 121.

Since the electrical disconnection between the third plate portion 159 and the first conductive area 121 is detected by the conductive area connection detection circuit 160, tamper that accompanying the disassembly of the case 110 may be detected.

Next, as illustrated in FIG. 9, when the conductive liquid Y is injected onto the tamper detection pattern 130 for hacking, the third conductive area 126 is electrically connected to the second conductive areas 122, 123, 124, and 125 or the first conductive area 121. The electrical connection between the third conductive area 126 and the second conductive areas 122, 123, 124, and 125, or the electrical connection between the third conductive area 126 and the first conductive area 121, is detected by the conductive area connection detection circuit 160. Consequently, the conductive area connection detection circuit 160 may detect tamper that accompanies the disassembly of the case 110 after forcibly connecting the first conductive area 121 and the second conductive areas 122, 123, 124, and 125 by using the conductive liquid Y.

Thus, in the mobile terminal according to the present exemplary embodiment, the second conductive areas 122, 123, 124, and 125 of the tamper detection pattern 130 are arranged separated from one another and a part of the third conductive area 126 is arranged between the second conductive areas 122, 123, 124, and 125. Then, since the third conductive area 126 is connected to the second conductive areas 122, 123, 124, and 125 or the first conductive area 121 by the conductive liquid Y that is injected to forcibly connect the first conductive area 121 and the second conductive areas 122, 123, 124, and 125, the conductive area connection detection circuit 160 may detect such tamper.

While the inventive concept has been particularly shown and described with reference to exemplary embodiments thereof, it will be understood that various changes in form and details may be made therein without departing from the spirit and scope of the following claims.

INDUSTRIAL APPLICABILITY

The present inventive concept may be used for payment terminals used for credit cards, mobile communication terminals such as mobile phones, and personal digital assistants (PDAs) that are referred to as personal portable terminals.

The invention claimed is:

1. A mobile terminal comprising:
a case capable of being assembled or disassembled;
a printed circuit board (PCB) arranged in the case and having a tamper detection pattern, the tamper detection pattern having a plurality of conductive areas and at least one non-conductive area;
a conductive area connection unit arranged between the case and the PCB and electrically connecting a part of the conductive areas during assembly of the case and electrically disconnecting the part of the conductive areas during disassembly of the case; and
a conductive area connection detection circuit electrically connected to the conductive areas and detecting an electric connection state between the conductive areas,
wherein the conductive areas comprises:
a first conductive area;
a plurality of second conductive areas arranged to be separated from one another and connected to the first conductive area via the conductive area connection unit; and
a third conductive area, at least a part of which is arranged between the second conductive areas.

2. The mobile terminal of claim 1, wherein the first conductive area is provided in a circular or polygonal shape in a central area of the tamper detection pattern.

3. The mobile terminal of claim 2, wherein the plurality of second conductive areas are arranged separated from one another along a circumference of the first conductive area around an imaginary center of the first conductive area.

4. The mobile terminal of claim 3, wherein the plurality of second conductive areas each are provided in a shape of an arc having a predetermined curvature.

5. The mobile terminal of claim 3, wherein the plurality of second conductive areas are arranged at an equiangular interval.

6. The mobile terminal of claim 3, wherein the third conductive area comprises:
   a first non-contact portion arranged between the plurality of second conductive areas;
   a second non-contact portion arranged close to the first conductive area and between the non-conductive areas; and
   a third non-contact portion arranged at a position separated from the first conductive area farther than the first non-contact portion.

7. The mobile terminal of claim 6, wherein the second non-contact portion has a width that increases toward the first conductive area.

8. The mobile terminal of claim 6, wherein the non-conductive area comprises:
   a first non-conductive area portion arranged between the first conductive area and the plurality of second conductive areas;
   a second non-conductive area portion extending from the first non-conductive area portion and arranged between the plurality of second conductive areas and the first non-contact portion; and
   a third non-conductive area portion extending from the first non-conductive area portion and arranged between the second non-contact portion and the first conductive area.

9. The mobile terminal of claim 3, wherein the conductive area connection unit comprises:
   a plurality of contact legs arranged separated from one another and connected to the plurality of second conductive areas; and
   a contact head connected to the plurality of contact legs and capable of moving in a direction approaching or separating from the first conductive area.

10. The mobile terminal of claim 9, wherein each of the plurality of contact legs comprises:
    a support portion supported by contacting each of the plurality of second conductive areas; and
    a connection portion extending in a direction separating from each of the plurality of second conductive areas and connected to the contact head.

11. The mobile terminal of claim 10, wherein the connection portion elastically biases the contact head in a direction to be separated from the first conductive area.

12. The mobile terminal of claim 9, wherein the contact head is provided in a shape of a circular or polygonal plate.

13. The mobile terminal of claim 12, wherein the contact head is provided in a shape of a circular plate, and the contact head comprises:
    a first plate portion connected to the plurality of contact legs;
    a second plate portion connected to the first plate portion and having a shape protruding downwardly; and
    a third plate portion connected to the second plate portion and having a shape protruding downwardly.

14. The mobile terminal of claim 13, wherein the third plate is provided in a shape of a circle having a predetermined diameter, and the first plate portion and the second plate portion are provided in a shape of a circle having the same center point as the third plate portion.

15. The mobile terminal of claim 3, wherein the tamper detection pattern has a circular shape, and the plurality of second conductive areas are configured with four conductive bodies arranged symmetrically with respect to the first conductive area as an imaginary center.

* * * * *